US009130397B2

(12) United States Patent
Leabman et al.

(10) Patent No.: US 9,130,397 B2
(45) Date of Patent: *Sep. 8, 2015

(54) WIRELESS CHARGING AND POWERING OF ELECTRONIC DEVICES IN A VEHICLE

(71) Applicant: ENERGOUS CORPORATION, San Jose, CA (US)

(72) Inventors: Michael A. Leabman, San Ramon, CA (US); Gregory Scott Brewer, Livermore, CA (US)

(73) Assignee: Energous Corporation, San Jose, CA (US)

( * ) Notice: Subject to any disclaimer, the term of this patent is extended or adjusted under 35 U.S.C. 154(b) by 160 days.

This patent is subject to a terminal disclaimer.

(21) Appl. No.: 13/939,655

(22) Filed: Jul. 11, 2013

(65) Prior Publication Data

US 2015/0015194 A1    Jan. 15, 2015

(51) Int. Cl.
*H02J 7/00* (2006.01)
*H02J 7/02* (2006.01)
*H02J 17/00* (2006.01)
*H04B 1/04* (2006.01)
*H04B 3/54* (2006.01)

(52) U.S. Cl.
CPC ............... *H02J 7/025* (2013.01); *H02J 17/00* (2013.01); *H04B 1/04* (2013.01); *H04B 3/54* (2013.01)

(58) Field of Classification Search
CPC ............ H02J 7/025; H04B 5/037; H01F 38/14
USPC .................. 320/104, 107, 108, 137
See application file for complete search history.

(56) References Cited

U.S. PATENT DOCUMENTS

| 6,127,942 | A  | 10/2000 | Welle |
| 6,798,716 | B1 | 9/2004 | Charych |
| 7,027,311 | B2 | 4/2006 | Vanderelli et al. |
| 7,639,994 | B2 | 12/2009 | Greene et al. |
| 7,643,312 | B2 | 1/2010 | Vanderelli et al. |
| 7,812,771 | B2 | 10/2010 | Greene et al. |
| 7,844,306 | B2 | 11/2010 | Shearer et al. |

(Continued)

FOREIGN PATENT DOCUMENTS

| EP | 2545635 A2 | 1/2013 |
| WO | WO2010022181 A1 | 2/2010 |

OTHER PUBLICATIONS

International Search Report dated Oct. 13, 2014 corresponding to International Patent Application No. PCT/US2014/045237, 5 pages.

(Continued)

*Primary Examiner* — Vuthe Siek
(74) *Attorney, Agent, or Firm* — Eric L. Sophir; Dentons US LLP

(57) ABSTRACT

Configurations and methods of wireless power transmission for charging or powering one or more electronic devices inside a vehicle are disclosed. A transmitter capable of single or multiple pocket-forming may be connected to a car lighter, where this transmitter may include a circuitry module and an antenna array integrated within the transmitter, or operatively connected through a cable. This cable may allow the positioning of the antenna array in different locations inside the vehicle suitable for directing RF waves or pockets of energy towards one or more electronic devices. Transmitter's configuration can be accessed by one or more electronic devices through Bluetooth communication in order to set up charging or powering priorities.

26 Claims, 6 Drawing Sheets

(56) References Cited

U.S. PATENT DOCUMENTS

| | | | |
|---|---|---|---|
| 7,868,482 B2 | 1/2011 | Greene et al. | |
| 7,898,105 B2 | 3/2011 | Greene et al. | |
| 7,925,308 B2 | 4/2011 | Greene et al. | |
| 8,115,448 B2 | 2/2012 | John | |
| 8,159,090 B2 | 4/2012 | Greene et al. | |
| 8,159,364 B2 | 4/2012 | Zeine | |
| 8,180,286 B2 | 5/2012 | Yamasuge | |
| 8,380,255 B2 | 2/2013 | Shearer et al. | |
| 8,410,953 B2 | 4/2013 | Zeine | |
| 8,432,062 B2 | 4/2013 | Greene et al. | |
| 8,446,248 B2 | 5/2013 | Zeine | |
| 8,461,817 B2 | 6/2013 | Martin et al. | |
| 8,558,661 B2 | 10/2013 | Zeine | |
| 8,621,245 B2 | 12/2013 | Shearer et al. | |
| 8,854,176 B2 | 10/2014 | Zeine | |
| 9,000,616 B2 | 4/2015 | Greene et al. | |
| 9,021,277 B2 | 4/2015 | Shearer et al. | |
| 2006/0238365 A1 | 10/2006 | Vecchione et al. | |
| 2007/0178945 A1 | 8/2007 | Cook et al. | |
| 2007/0191075 A1 | 8/2007 | Greene et al. | |
| 2009/0200985 A1 | 8/2009 | Zane et al. | |
| 2009/0207092 A1* | 8/2009 | Nysen et al. | 343/876 |
| 2010/0027379 A1 | 2/2010 | Saulnier et al. | |
| 2010/0181961 A1* | 7/2010 | Novak et al. | 320/108 |
| 2010/0194206 A1 | 8/2010 | Burdo et al. | |
| 2010/0244576 A1 | 9/2010 | Hillam et al. | |
| 2010/0315045 A1* | 12/2010 | Zeine | 320/137 |
| 2010/0332401 A1* | 12/2010 | Prahlad et al. | 705/80 |
| 2011/0074342 A1 | 3/2011 | MacLaughlin | |
| 2011/0115303 A1 | 5/2011 | Baarman et al. | |
| 2011/0282415 A1 | 11/2011 | Eckhoff et al. | |
| 2012/0157019 A1 | 6/2012 | Li | |
| 2012/0193999 A1 | 8/2012 | Zeine | |
| 2012/0299540 A1 | 11/2012 | Perry | |
| 2012/0299541 A1 | 11/2012 | Perry | |
| 2012/0299542 A1 | 11/2012 | Perry | |
| 2012/0300588 A1 | 11/2012 | Perry | |
| 2012/0300592 A1 | 11/2012 | Perry | |
| 2012/0300593 A1 | 11/2012 | Perry | |
| 2013/0207604 A1 | 8/2013 | Zeine | |
| 2013/0241468 A1 | 9/2013 | Moshfeghi | |
| 2013/0241474 A1 | 9/2013 | Moshfeghi | |
| 2013/0264997 A1* | 10/2013 | Lee et al. | 320/106 |
| 2014/0035524 A1 | 2/2014 | Zeine | |
| 2014/0217967 A1 | 8/2014 | Zeine et al. | |
| 2014/0241231 A1 | 8/2014 | Zeine | |
| 2014/0252813 A1* | 9/2014 | Lee et al. | 297/180.12 |
| 2014/0265725 A1 | 9/2014 | Angle et al. | |
| 2014/0265727 A1 | 9/2014 | Berte | |
| 2014/0265943 A1 | 9/2014 | Angle et al. | |
| 2014/0281655 A1 | 9/2014 | Angle et al. | |
| 2014/0325218 A1* | 10/2014 | Shimizu et al. | 713/168 |

OTHER PUBLICATIONS

Written Opinion of the International Searching Authority dated Oct. 13, 2014 corresponding to International Patent Application No. PCT/US2014/045237, 11 pages.

* cited by examiner

WIRELESS CHARGING AND POWERING OF ELECTRONIC DEVICES IN A VEHICLE

CROSS-REFERENCES TO RELATED APPLICATIONS

The present disclosure is related to U.S. Non-Provisional patent application Ser. No. 13/891,430 filed May 10, 2013, entitled "Methodology For Pocket-forming" and Ser. No. 13/925,469 filed Jun. 24, 2013, entitled "Methodology for Multiple Pocket-Forming" the entire contents of which are incorporated herein by these references.

FIELD OF INVENTION

The present disclosure relates generally to wireless power transmission, and more particularly, to configurations and methods of wireless power transmission in vehicles.

BACKGROUND OF THE INVENTION

The charging or powering of electronic devices in vehicles may include several limitations. Typically, electronic devices such as laptop computers, smartphones, portable gaming devices, tablets, and the like, may require the use of different car charger adapters for each type of electronic device, depending on the model and electrical ratings. This can represent an inconvenience for a user, from an economical and practical perspective, who would need to invest in and carry several car charger adapters. In addition, when using the car's cigarette lighter, charging may be limited to a sequential operation, meaning that the user would have to connect one electric device after the other for suitable charging. This may prove to be inefficient and cumbersome for the user.

For the foregoing reasons, there may be a need for wireless charging methods and configurations that may allow efficient and simultaneous charging or powering of one or more electronic devices inside a vehicle.

SUMMARY OF THE INVENTION

Configurations and methods for wireless power transmission in vehicles are disclosed. Wireless power transmission for powering or charging one or more electronic devices inside a vehicle may include a transmitter capable of emitting RF waves for the generation of pockets of energy; and one or more electronic devices operatively coupled with one or more receivers that may utilize these pockets of energy for charging or powering.

A method for wireless power transmission in a vehicle comprises pocket forming for generating pockets of energy from a transmitter connected to a power source in the vehicle and coupling a receiver to an electronic device located within the vehicle for receiving the pockets of energy and utilizing the pockets of energy for powering and charging the electronic device.

The transmitter utilized for pocket-forming may include an array of antennas, a circuitry module, and a power source for the transmitter, where this power source may be in the form of a car lighter socket. The array of antennas may include two or more antenna elements, while the circuitry module may include a Radio frequency integrated circuit (RFIC), a microcontroller, and a communication component.

According to an embodiment, a wireless power transmission for charging one or more electronic devices inside a vehicle may include a transmitter operatively connected to a car lighter socket, where this transmitter may function as a standalone device integrating the circuitry module and antenna array in a cylindrical or rectangular housing. This transmitter may generate single or multiple pocket-forming for charging or powering one or more electronic devices which may be located in different positions inside the vehicle.

According to another embodiment, a wireless power transmission for charging one or more electronic, devices inside a vehicle may include a transmitter operatively connected to a car lighter socket, where this transmitter may include a cable for connecting the circuitry module and the antenna array. This cable may allow positioning the antenna array in the vehicle's sun visor or in any suitable location inside the vehicle, and separately from the circuitry module which may he connected to the car lighter socket.

Yet in another embodiment, a wireless power transmission for charging one or more electronic devices inside a vehicle may include a transmitter operatively connected to a car lighter socket, where this transmitter may include a cable for connecting the circuitry module and the antenna array. This cable may allow positioning the antenna array underneath the vehicle's floor mats or in any suitable location inside the vehicle, and separately from the circuitry module which may be connected to the car lighter socket.

In a further embodiment, a wireless power transmission process for charging one or more electronic devices inside a vehicle may begin with a wireless charging request, followed by a Bluetooth scanning that may identify one or more electronic devices available for wireless charging. Available electronic devices can log in into a charging application that may provide, access to the transmitter's configuration, where charging or powering priorities can be set for each of the available electronic devices. Based on these charging or powering priorities, the transmitter may direct pocket-forming towards the designated electronic devices which can be charged, sequentially or simultaneously, according to the established charging or powering order.

The disclosed configurations and methods of wireless power transmission may provide efficient and simultaneous charging of one or more electronic devices, while using a single transmitter that may position its antenna array in suitable locations across the vehicle for optimal pocket forming. Additional features and advantages can become apparent from the detailed descriptions which follow, taken in conjunction with the accompanying drawings.

BRIEF DESCRIPTION OF THE DRAWINGS

Embodiments of the present disclosure are described by way of example with reference to the accompanying figures which are schematic and may not be drawn to scale. Unless indicated as representing the background information, the figures represent aspects of the invention.

DETAILED DESCRIPTION OF THE DRAWINGS

Definitions

Figure 1:
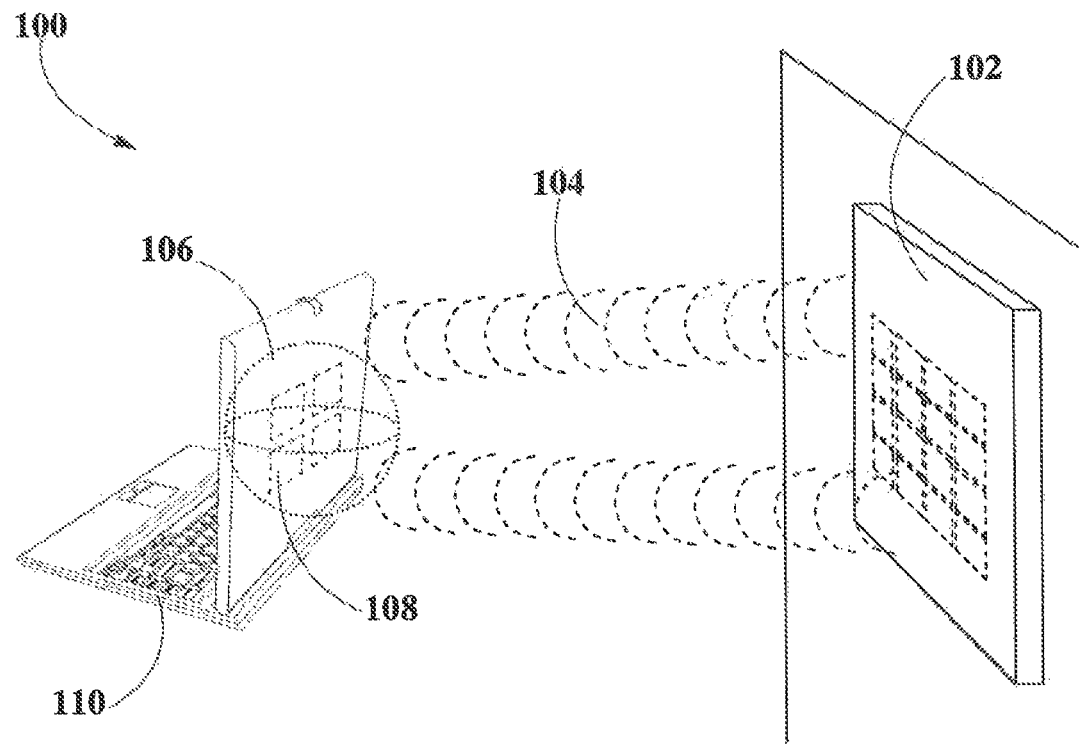
FIG. 1 shows a wireless power transmission using pocket-forming, according to the present invention.

"Pocket-forming" may refer to generating two or more RF waves which converge in 3-d space, forming controlled constructive and destructive interference patterns.

"Pockets of energy" may refer to areas or regions of space where energy or power may accumulate in the form of constructive interference patterns of RF waves.

"Null-space" may refer to areas or regions of space where pockets of energy do not form because of destructive interference patterns of RF waves.

"Transmitter" may refer to a device, including a chip which may generate two or more RF signals, at least one RF signal being phase shifted and gain adjusted with respect to other RF signals, substantially all of which pass through one or more RF antenna such that focused RF signals are directed to a target.

"Receiver" may refer to a device including at least one antenna element, at least one rectifying circuit and at least one power converter, which may utilize pockets of energy for powering, or charging an electronic device.

"Adaptive pocket-forming" may refer to dynamically adjusting pocket forming to regulate power on one or more targeted receivers.

"Reflector" may refer to a device capable of efficiently reflecting the power of RF waves from a transmitter towards a receiver for the wireless charging of an electronic device.

DESCRIPTION OF THE DRAWINGS

In the following detailed description, reference is made to the accompanying drawings, which form a part hereof. In the drawings, which may not be to scale or to proportion, similar symbols typically identify similar components, unless context dictates otherwise. The illustrative embodiments described in the detailed description, drawings and claims, are not meant to be limiting. Other embodiments can be used and/or and other changes can be made without departing from the spirit or scope of the present disclosure.

FIG. 1 illustrates a wireless power transmission 100 using pocket forming. A transmitter 102 may transmit controlled Radio Frequency (RF) waves 104 which may converge in 3-d space. These RF waves 104 may be controlled through phase and/or relative amplitude adjustments to form constructive and destructive interference patterns (pocket-forming). Pockets of energy 106 may be formed at constructive interference patterns and can be 3-dimensional in shape, while null-spaces may be generated at destructive interference patterns. A receiver 108 may then utilize pockets of energy 106 produced by pocket-forming for charging or powering an electronic device 110, for example, a smartphone, a tablet, a laptop computer (as shown in FIG. 1), a music player, an electronic toy, and the like. In some embodiments, there can be multiple transmitters 102 and/or multiple receivers 108 for powering various electronic devices 110 at the same time. In other embodiments, adaptive pocket-forming may be used to regulate the power transmitted to electronic devices 110.

Figure 2:
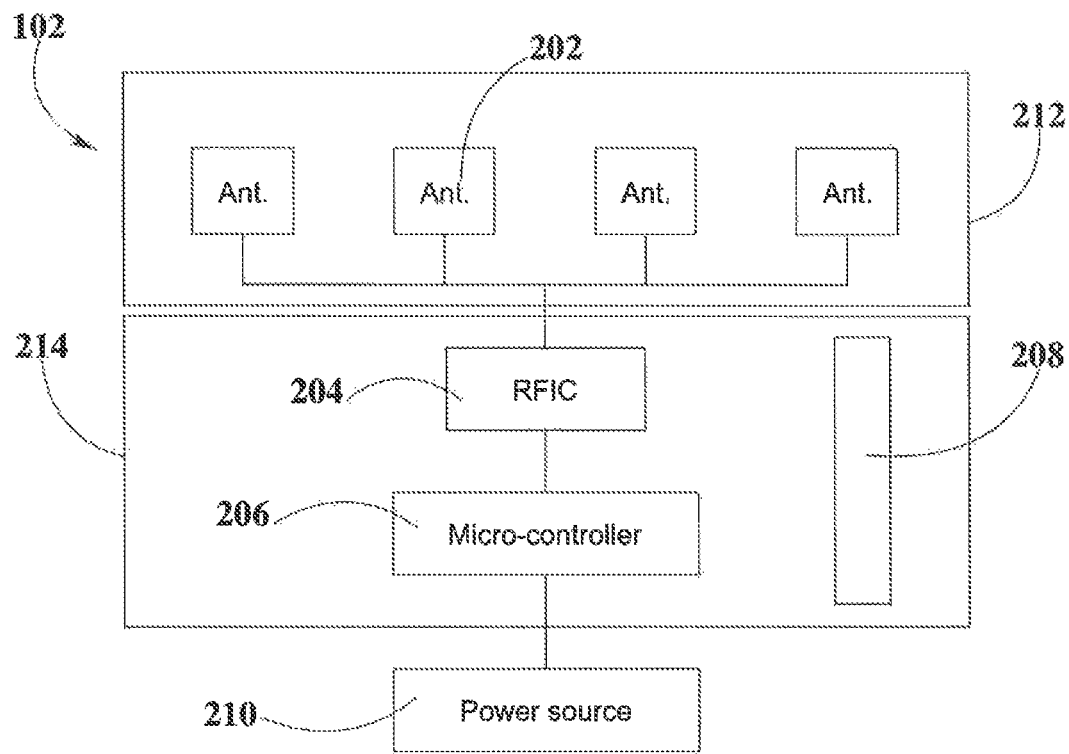
FIG. 2 illustrates a simplified block diagram of a transmitter which may be utilized for a wireless power transmission according to FIG. 1.

FIG. 2 illustrates a simplified block diagram of a transmitter 102 which may be utilized for wireless power transmission according to the scope of the present disclosure. Transmitter 102 may include one or more antenna elements 202, one or more Radio frequency integrated circuit (RFIC) 204, one or more microcontroller 206, a communication component 208, and a power source 210. Components in transmitter 102 may be manufactured using meta-materials, micro-printing of circuits, nano-materials, and the like. Transmitter 102 may be responsible for pocket-forming, adaptive pocket-forming and multiple pocket-forming through the use of the components mentioned in the foregoing paragraph.

Antenna elements 202 may include flat antenna elements, patch antenna elements, dipole antenna elements, or any suitable antenna for wireless power transmission 100. Shape and orientation of antenna elements 202 may vary in dependency of the desired features of transmitter 102, where orientation may be flat in X, Y, and Z axis, as well as various orientation types and combinations in three dimensional arrangements. Antenna elements 202 materials may include any suitable material that may allow Radio signal transmission with high efficiency, good heat dissipation and the like. Number of antenna elements 202 may vary in relation with the desired range and power transmission capability on transmitter 102 where the more antenna elements 202, the wider range and higher power transmission capability.

Antenna elements 202 may include suitable antenna types for operating in frequency bands such as 900 MHz, 2.5 GHz or 5.8 GHz as these frequency bands conform to Federal Communications Commission (FCC) regulations part 18 (Industrial, Scientific and Medical equipment). Antenna elements 202 may operate in independent frequencies, allowing a multichannel operation of Pocket-forming.

In addition, antenna elements 202 may have at least one polarization or a selection of polarizations. Such polarization may include vertical pole, horizontal pole, circularly polarized, left hand polarized, right hand polarized, or a combination of polarizations. The selection of polarizations may vary in dependency of transmitter 102 characteristics. In addition, antenna elements 202 may be located in various surfaces of transmitter 102.

The combination of two or more antenna elements 202 may form antenna array 212, where these antenna elements 202 may operate in single array, pair array, quad array and any other suitable arrangement, which may be designed in accordance with the desired application.

The circuitry module 214 of transmitter 102 may include RFIC 204, microcontroller 206, and communication component 208. RFIC 204 may include a plurality of RF circuits which may include digital and/or analog components, such as, amplifiers, capacitors, oscillators, piezoelectric crystals and the like. RFIC 204 may control features of antenna elements 202, such as gain and/or phase for pocket-forming and manage through it direction, power level, and the like. The phase and the amplitude of pocket-forming in each antenna elements 202 may be regulated by the corresponding RFIC 204 in order to generate the desired pocket-forming and null steering. RFIC 204 may be connected to microcontroller 206, which may include a digital signal processor (DSP), PIC-Class microprocessor, central processing unit, computer and the like. Microcontroller 206 may control a variety of features of RFIC 204 such as, time emission of pocket-forming, direction of the pocket-forming, bounce angle, power intensity and the like. Furthermore, microcontroller 206 may control multiple pocket-forming over multiple receivers 108 or over a single receiver 108.

Microcontroller 206 may manage and control communication protocols and signals by controlling communication component 208. Microcontroller 206 may process information received by communication component 208 which may send and receive signals to and from a receiver 108 in order to track it and concentrate the pocket of energy 106 on it. In addition, other information may be transmitted from and to receiver 108, where such information may include authentication protocols among others. Communication component 208 may include and combine Bluetooth technology, infrared communication, WI-FI, FM radio among others. Microcontroller 206 may determine optimum times and locations for pocket-forming, including the most efficient trajectory to transmit pocket forming in order to reduce losses due to obstacles. Such trajectory may include direct pocket-forming, bouncing, and distance discrimination of pocket-forming.

Transmitter 102 may be fed by a power source 210 which may include AC or DC power supply. Voltage, power and current intensity provided by power source 210 may vary in dependency with the required power to be transmitted. Conversion of power to radio signal may be managed by microcontroller 206 and carried out by RFIC 204, which may utilize a plurality of methods and components to produce radio signals in a wide variety of frequencies, wavelength, intensities and other features. As an exemplary use of a variety of methods and components for radio signal generation, oscillators and piezoelectric crystals may be used to create and change radio frequencies in different antenna elements 202. In addition, a variety of filters may be used for smoothing signals as well as amplifiers for increasing power to be transmitted.

Transmitter 102 may emit pocket-forming with a power capability from few watts to over hundreds of watts. Each antenna element 202 may manage a certain power capacity. Such power capacity may be related with the application.

Figure 3:
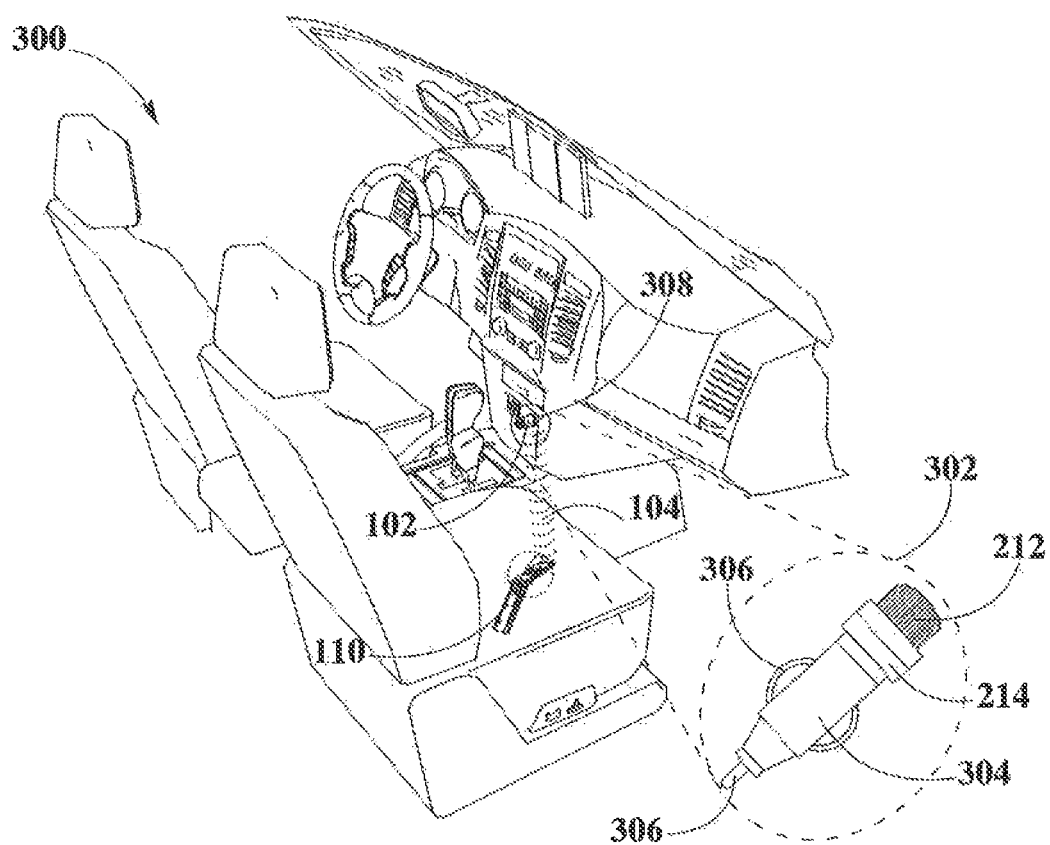
FIG. 3 depicts a wireless power transmission that can be implemented for charging or powering one or more electronic devices inside a vehicle according to FIG. 1.

Referring now to FIG. 3, a wireless power transmission 300 can be implemented in order to charge or power one or more electronic devices 110 inside a vehicle. According to some aspects of this embodiment, transmitter 102 can be configured within a cylindrical shape, exhibiting a longitude between about 2 and 3 inches, and a diameter ranging from about 0.5 inch to about 1 inch. As illustrated in close-up view 302, transmitter 102 can include a suitable connector 304 with pins 306 that can be inserted into car lighter socket 308 for powering transmitter 102. Transmitter 102 can function as a standalone, self-contained device that can integrate circuitry module 214 and antenna array 212, along with connector 304 and pins 306.

Car lighter socket 308 can supply 12 or 24 DC volts for powering transmitter 102, which may be sufficient power for most portable electronic devices 110 such as smartphones, DVD players, portable gaming systems, tablets, laptops computers, and the like. In some embodiments, circuitry module 214 of transmitter 102 can include a DC-to-DC converter or a DC-to-AC converter, depending of the electrical charging requirements of electronic device 110. Yet in other embodiments, circuitry module 214 can include a switchable power converter that can be configured according to the charging requirements of electronic device 110.

Operation of transmitter 102 in FIG. 3 may be similar to the operation described in FIG. 2 where transmitter 102 can be driven by a power source 210, in this case, car lighter socket 308. Transmitter 102 can use communication component 208 (not shown in FIG. 3) in circuitry module 214 to locate a receiver 108 (not shown in FIG. 3) embedded in electronic device 110. Microcontroller 206 (not shown in FIG. 3) in circuitry module 214 may determine the optimum path for the generation of pocket-forming, according to the location of electronic device 110 within the vehicle. As depicted in FIG. 3, electronic device 110 can be located in the passenger seat, right beside the driver seat. Microcontroller 206 may communicate with RFIC 204 (not shown in FIG. 4) in circuitry module 214 so as to control the generation and transmission of RF waves 104 through antenna array 212 which may include two or more antenna elements 202. Transmission of RF waves 104 can be aimed at electronic device 110 in the passenger seat for the generation of pocket-forming suitable for charging or powering electronic device 110.

Wireless power transmission 300 can also be used for powering or charging an electronic device 110 located in the backseats of the vehicle, or any other locations inside vehicle. In this case, transmitter 102 can use any suitable reflecting surface of the vehicle, preferably metallic, in order to transmit RF waves 104 and redirect the formation of pockets of energy 106 (not shown in FIG. 3) towards electronic device 110, with minimal or no power loss. For example, transmitter 102 can use the vehicle ceiling to bounce off transmitted RF waves 104 towards electronic device 110 for the generation of pockets of energy 106 capable of providing suitable charging or powering to electronic device 110.

According to other aspects of this embodiment, wireless power transmission 300 can power or charge two or more electronic devices 110 inside vehicle, where transmitter 102 can be capable of producing multiple pocket-forming. In such case, transmitter 102 can generate multiple RF waves 104 directly aimed at or reflected towards electronic devices 110 through the use of suitable reflecting surfaces of the vehicle, thereby powering or charging one or more electronic devices 110 at the same time.

Figure 4:
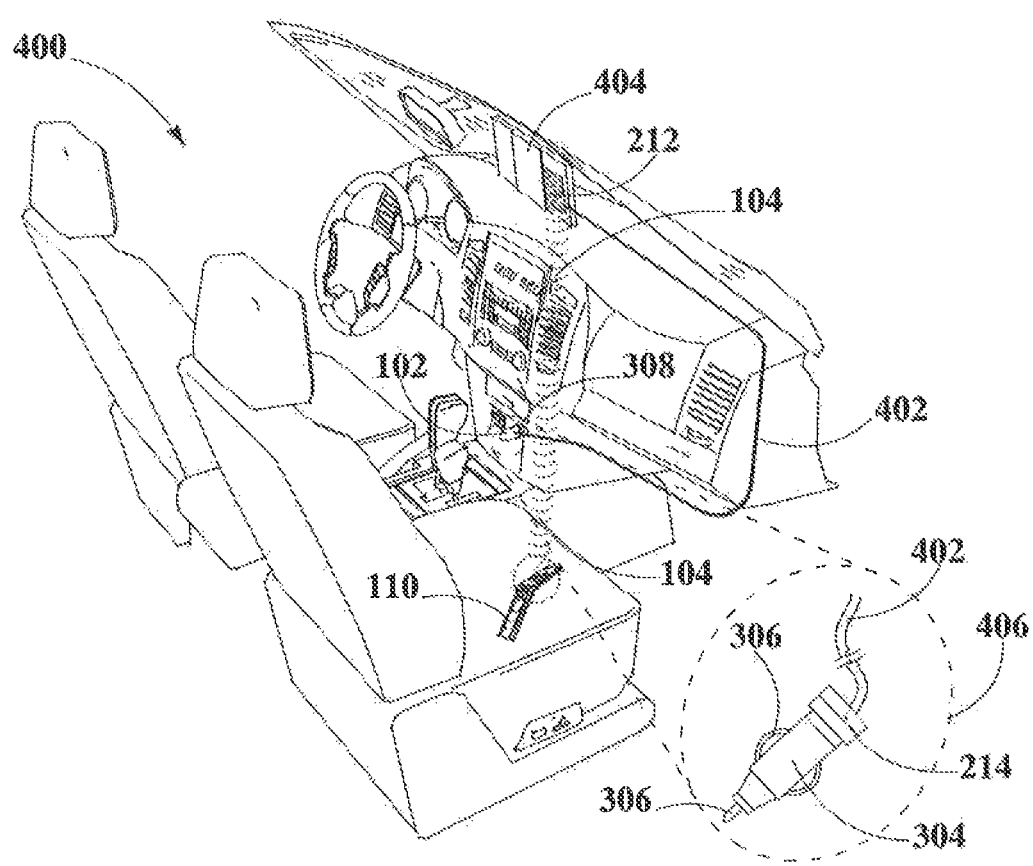
FIG. 4 illustrates a wireless power transmission where a transmitter may include a cable for positioning antenna array in a vehicle's sun visor according to the present invention.

FIG. 4 illustrates a wireless power transmission 400 where transmitter 102 can include a cable 402 for positioning antenna array 212 in different areas inside a vehicle. As seen in close-up view 406, transmitter 102, through the use of connector 304 and pins 306, can be connected to car lighter socket 308 to receive power necessary for operation. According to some aspects of this embodiment, circuitry module 214 of transmitter 102 can be operatively coupled with car lighter socket 308, while antenna array 212 can be operatively connected with circuitry module 214 through cable 402, thereby allowing antenna array 212 to be separately positioned across vehicle, as required by the application or according to the relative position of one or more electronic devices 110. For example, as shown in FIG. 4, cable 402 can be run from circuitry module 214 to antenna array 212 which can be slipped in one of the vehicle's sun visor 404. In this way, antenna array 212 can emit RF waves 104 from a high-up position down to one or more electronic devices 110 for the generation of pockets of energy 106 that may provide suitable charging or powering. This configuration may be particularly beneficial for charging or powering electronic devices 110 in the vehicle's backseats.

Antenna array 212 in FIG. 4 can exhibit a flat rectangular shape, with dimensions between about 4×2 inches to about 8×4 inches, depending on the number and configuration of antenna elements 202. Cable 402 can include a suitable conductor covered by an insulating material, it may be flexible and may exhibit a suitable length as required by the application. Preferably, cable 402 can be positioned between circuitry module 214 of transmitter 102 and antenna array 212 in such a way as to not obstruct the visibility of the windshield, as illustrated in FIG. 4.

Figure 5:
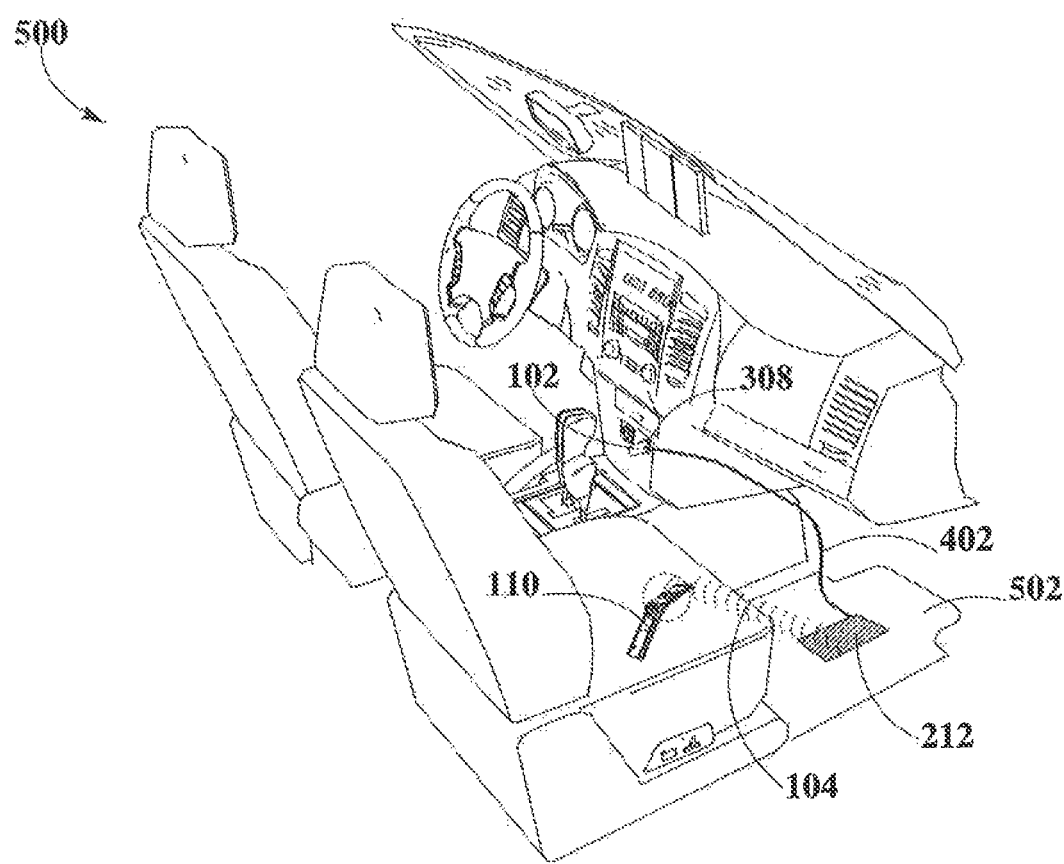
FIG. 5 shows a wireless power transmission where a transmitter may include a cable for positioning an antenna array underneath the vehicle's floor mats according to the present invention.

Referring now to FIG. 5, a wireless power transmission 500 may include a transmitter 102 with its circuitry module 214 connected to car lighter socket 308, while its antenna array 212 can be positioned on the vehicle's floor 502. Similarly as in FIG. 4, antenna array 212 may exhibit a flat rectangular shape with dimensions between about 4×2 inches to about 8×4 inches, depending on the number and configuration of antenna elements 202. According to some aspects of this embodiment, antenna array 212 can be covered by the vehicle floor mats (not shown in FIG. 5), where this antenna array 212 can emit RF waves 104 from the bottom of the vehicle floor 502 upwards to one or more electronic devices 110 that may be positioned in the passenger seat, as illustrated in FIG. 5, or in any another suitable location within the vehicle.

Similarly as in FIG. 4, cable 402 can operatively connect circuitry module 214 (not shown in FIG. 5) to antenna array 212 for the transmission of RF waves 104 that may produce pockets of energy 106 suitable for charging or powering one or more electronic devices 110 inside the vehicle. In this particular embodiment, antenna array 212 may include a suitable combination of flexible and conducting materials that may allow transmission of RF waves 104, while avoiding fractures or breakdown when a passenger step on antenna array 212 placed underneath the vehicle's floor 502 mats.

Although these exemplary embodiments of wireless power transmission may describe transmitter 102 as a standalone device that may be connected to a car lighter socket 308, including the different configurations and positions for its antenna array 212, other transmitter 102 configurations and features may be contemplated as well. For example, antenna array 212 of transmitter 102 may be positioned in any suitable areas inside the vehicle such as passenger seats and backseats, storage compartments, and center console among others. In other embodiments, transmitter 102 may be configured as built-in device that may be factory-integrated in suitable areas or parts of the vehicle such as sun visors, sunroofs, sound speakers, dashboards, and the like.

Figure 6:
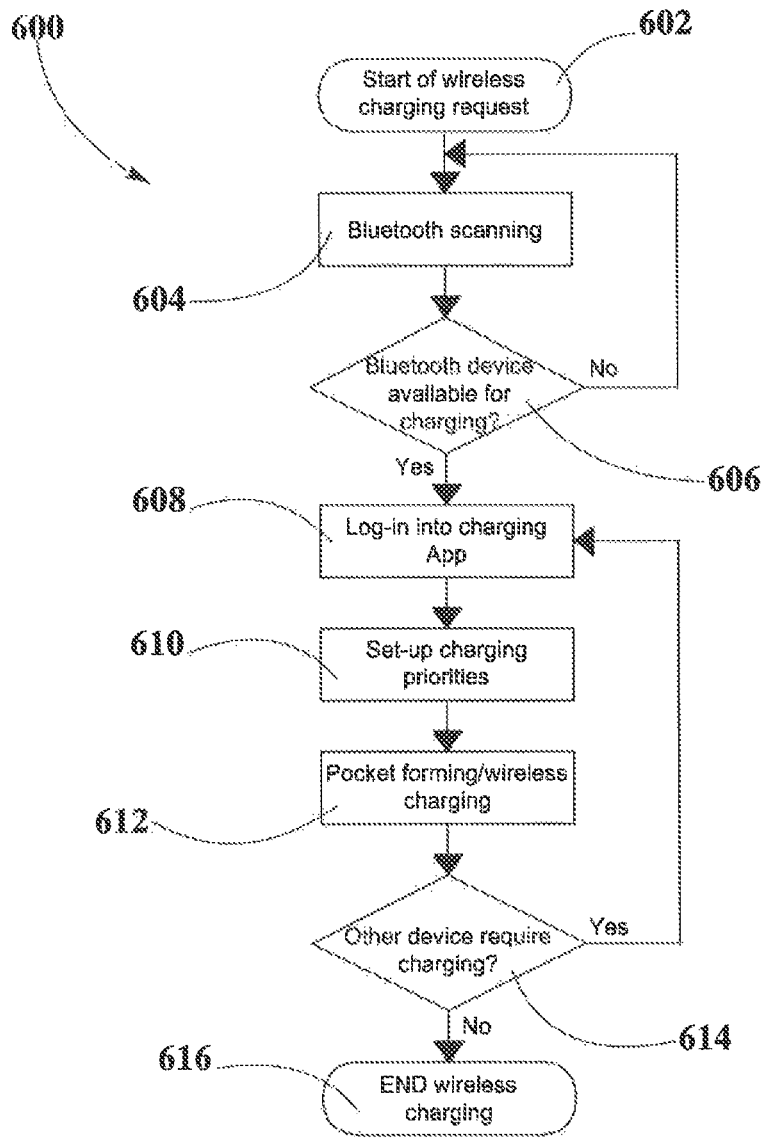
FIG. 6 depicts a simplified flowchart of a wireless power transmission process that may be implemented for charging one or more electronic devices inside a vehicle according to the present invention.

FIG. 6 shows a simplified flowchart of a wireless power transmission process 600 that may be implemented for charging one or more electronic devices 110 inside a vehicle. This process may be applicable in the embodiments of wireless power transmission 300, 400, 500.

Wireless power transmission process 600 may begin with a wireless charging request, at block 602. Subsequently, transmitter 102 may perform a Bluetooth scanning for identifying any suitable electronic device 110 that may require wireless charging or powering, at block 604. Specifically, this Bluetooth scanning may be carried out by communication component 208 integrated in circuitry module 214 of transmitter 102.

Using Bluetooth scanning, transmitter 102 may determine if there are one or more electronic devices 110 available for charging or powering, at block 606. Basically, any suitable electronic device 110 operatively coupled with a receiver 108 and capable of Bluetooth communication may be considered "available" for wireless charging or powering. If there are no available electronic devices 110 for wireless charging or powering, then Bluetooth scanning can be repeated until there is at least one electronic device 110 available. If one or more electronic devices 110 are available, then wireless power transmission process 600 may continue at block 608, where one or more electronic devices 110 may log in into a charging application developed in any suitable operating systems such as iOS, Android, and Windows, among others. This charging application may establish a suitable communication channel between transmitter 102 and electronic device 110, where configuration of transmitter 102 can be accessed and reprogrammed according to the charging or powering requirements of electronic devices 110.

One or more electronic devices 110 may access the charging application in order to modify the configuration of transmitter 102. Specifically, one or more electronic devices 110 can communicate with transmitter 102 via Bluetooth and log in into the charging application to set-up charging or powering priorities as necessary, at block 610. For example, in a long family trip, charging or powering priorities can be established to first charge or power-up electronic devices 110 for kids' entertainment such as portable gaming consoles and tablets, followed by the charging or powering of parents' electronic devices 110 such as smartphones and laptops. Other transmitter 102 parameters such as power intensity and pocket-forming focus/timing can also be modified through the use of this charging application. However, authorization access to transmitter 102 configuration may be restrained to certain users who may be required to provide corresponding user-credentials and passwords.

After charging priorities in transmitter 102 are set, transmission of RF waves 104 towards the designated electronic devices 110 can begin, at block 612, where these RF waves 104 may generate pockets of energy 106 at receivers 108 for powering or charging one or more electronic devices 110 sequentially or simultaneously. In other embodiments, different charging or powering thresholds may be established for maintaining suitable operation. For example, minimum and maximum charging thresholds may be established at about 20% and 95% of total charge respectively, where charging or powering of electronic devices 110 may be stopped when reaching 95% of total charge, and may resume when total charge of electronic devices 110 falls below 20%.

Bluetooth scanning may continue throughout the process in order to identify additional electronic devices 110 that may require wireless charging or powering, at block 614. If new or additional electronic devices 110 are identified, then transmitter 102 may be accessed through the charging application to set charging or powering priorities for these additional electronic devices 110. If no further electronic devices 110 are recognized by Bluetooth scanning, then wireless power transmission process 600 may end, at block 616.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

Having thus described the invention, we claim:

1. A method for wireless power transmission in a vehicle, comprising:
   pocket-forming for generating pockets of energy from a transmitter connected to a power source in the vehicle;
   coupling a receiver to an electronic device located within the vehicle for receiving the pockets of energy; and
   utilizing the pockets of energy for powering and charging the electronic device,
   wherein the receiver and transmitter each include a circuitry for a radio frequency integrated circuit, an antenna array, a microcontroller and a communication component circuitry for communications between the receiver and the transmitter to control data information and the powering and charging of the electronic device.

2. The method for wireless power transmission in a vehicle of claim 1, wherein the power source is a vehicle lighter socket or a direct connection to a power wire within the vehicle.

3. The method for wireless power transmission in a vehicle of claim 2, wherein the electronic display is a laptop computer, a smartphone, a portable gaming device, a tablet, a cell phone, an iPod or a portable device with a chargeable battery.

4. The method for wireless power transmission in a vehicle of claim 1, further comprising the step of authenticating the data information to a cloud based service for easy access by an end user.

5. The method for wireless power transmission to a portable electronic device of claim 4, wherein the transmitter generates single or multiple pocket-forming for charging or powering one or more electronic devices located in predetermined positions throughout the vehicle.

6. The method for wireless power transmission in a vehicle of claim 1, wherein the transmitter is a standalone device integrating the circuitry with an antenna array configured in a cylindrical, rectangular or other geometric shape for placement within the vehicle.

7. The method for wireless power transmission in a vehicle of claim 1, wherein the transmitter includes a cable for connecting the circuitry and the antenna array and further comprising the step of positioning the antenna array in a sun visor, under a floor mat or other suitable location separate from the circuitry inside the vehicle.

8. The method for wireless power transmission in a vehicle of claim 1, further including the step of authenticating and selecting the transmitter and receiver for charging the electronic device with protocols including communicating over Bluetooth, infrared, Wi-Fi and FM radio signals within the vehicle.

9. The method for wireless power transmission in a vehicle of claim 1, wherein the transmitter is configured within a cylindrical shape of predetermined height and diameter.

10. The method for wireless power transmission in a vehicle of claim 1, further comprising the step of transmitting simultaneously both Wi-Fi signals and pocket-forming RF waves from the transmitter to the receiver.

11. A method for wireless power transmission in a vehicle, comprising:
pocket-forming for generating pockets of energy from a transmitter connected to a power source in the vehicle;
coupling a receiver to an electronic device located within the vehicle for receiving the pockets of energy;
utilizing the pockets of energy for powering and charging the electronic device;
communicating between the receiver and transmitter through short RF waves or pilot signals on conventional wireless communication protocols including Bluetooth, Wi-Fi or Zigbee with the battery level information for each electronic device;
scanning for Bluetooth electronic devices available for wireless charging; and
prioritizing the charging or powering of the available electronic devices whereby the transmitter directs pocket-forming towards predetermined electronic devices in priority order,
wherein the power source is a vehicle lighter socket or a direct connection to a power wire within the vehicle, and wherein the electronic device is a laptop computer, a smartphone, a portable gaming device, a tablet, a cell phone, an iPod or a portable device with a chargeable battery.

12. A method of wireless power transmission to an electronic device within a vehicle comprising:
supplying pockets of energy to a receiver including an antenna element, a digital signal processor (DSP), a rectifier, a power converter and a communications device connected to the electronic device with a battery;
pocket-forming in a transmitter including antenna elements, a RF integrated chip controlled by a DSP for pocket-forming to develop pockets of energy for charging and powering a battery in the electronic device and a communication device controlled by the DSP;
powering the transmitter from a power source within the vehicle;
communicating the power level of the battery from the receiver to the transmitter through short RF signals between the receiver and transmitter communication devices over conventional wireless communication protocols;
decoding short RF signals from the receiver communication device to identify a gain and phase of the receiver to determine the location of the receiver in each electronic device within the vehicle;
controlling the charging and powering of each electronic device by the decoded short RF signals; and
charging the battery of each electronic device when in the proximity to the transmitter to provide an inexhaustible source of operating power for each electronic device.

13. The method of wireless power transmission to an electronic device within a vehicle of claim 12, further including the step of uploading battery information and a location of the electronic device within the vehicle to a cloud-based service.

14. A method of wireless power transmission to an electronic device within a vehicle, comprising:
supplying pockets of energy to a receiver including an antenna element, a digital signal processor (DSP), a rectifier, a power converter and a communications device connected to the electronic device with a battery;
pocket-forming in a transmitter including antenna elements, a RF integrated chip controlled by a DSP for pocket-forming to develop pockets of energy for charging and powering a battery in the electronic device and a communication device controlled by the DSP;
powering the transmitter from a power source within the vehicle;
communicating the power level of the battery from the receiver to the transmitter through short RF signals between the receiver and transmitter communication devices over conventional wireless communication protocols; and
reflecting the pockets of energy to the receiver of an electronic device located in the backseat of the vehicle for charging and powering the electronic device.

15. A method of wireless power transmission to an electronic device within a vehicle, comprising:
supplying pockets of energy to a receiver including an antenna element, a digital signal processor (DSP), a rectifier, a power converter and a communications device connected to the electronic device with a battery;
pocket-forming in a transmitter including antenna elements, a RF integrated chip controlled by a DSP for pocket-forming to develop pockets of energy for charging and powering a battery in the electronic device and a communication device controlled by the DSP;
powering the transmitter from a power source within the vehicle;
communicating the power level of the battery from the receiver to the transmitter through short RF signals between the receiver and transmitter communication devices over conventional wireless communication protocols;
wherein the transmitter is configured within a cylindrical shape of a vehicle charger having one end pluggable into a vehicle lighter socket and the other end forms the antenna elements.

16. The method of wireless power transmission to an electronic device within a vehicle of claim 15, wherein the transmitter includes a cable and the chip is located within the charger plugged into the vehicle lighter socket and the cable connects to the antenna elements located separately from the charger in a predetermined location within the vehicle.

17. The method of wireless power transmission to an electronic device within a vehicle of claim 16, wherein the antenna elements are in a generally flat configuration and located behind the sun visor of the vehicle.

18. The method of wireless power transmission to an electronic device within a vehicle of claim 16, wherein the antenna elements are in a generally flat configuration and located under the floor mat of the vehicle.

19. A method of wireless power transmission to an electronic device within a vehicle, comprising:
  searching for a wireless charging request for electronic devices within the vehicle;
  scanning for a Bluetooth signal from a receiver for identifying any suitable electronic device requiring the charging of a battery providing power to the electronic device;
  logging into a charging application;
  setting up charging priorities between identified electronic devices;
  pocket-forming from a transmitter communicating with the identified electronic device for supplying pockets of energy to the receiver of the electronic device requiring charging; and
  ending wireless power transmission to the electronic devices when fully charged, wherein the cloud services are either public or private and require user credentials or authorization to gain access to accumulated data of the electronic device various locations over a period of time.

20. The method of wireless power transmission to an electronic device within a vehicle of claim 19, wherein the transmitter is configured in the shape of a car charger and is plugged into a car lighter socket for a power source.

21. A wireless power transmission to a portable electronic device within a vehicle, comprising:
  a receiver connected to the portable electronic device with an antenna for receiving pockets of energy formed from constructive interference patterns of RF waves to charge a battery for powering the electronic device;
  a transmitter including a RF chip connected to antenna elements for generating pocket-forming RF waves having a connection to a power source within the vehicle.

22. The wireless power transmission to a portable electronic device within a vehicle of claim 21, wherein the receiver communicates power requests with the transmitter through short RF waves or pilot signals sent through receiver and transmitter antennas, respectively.

23. The wireless power transmission to a portable electronic device within a vehicle of claim 22, wherein the receiver communicates power requests for charging through communication protocols of Bluetooth, Wi-Fi, Zigbee or radio FM signals.

24. The wireless power transmission to a portable electronic device within a vehicle of claim 22, wherein the maximum charging thresholds are approximately 20% to 95% of the total battery charge, respectively, and wherein charging or powering of the electronic device are stopped when reaching 95 of total battery charge and is resumed when the total battery charge falls below 20%.

25. The wireless power transmission to a portable electronic device within a vehicle of claim 21, wherein the transmitter further includes a cable connected between the RF chip and the antenna elements arranged in a generally flat configuration for locating the antenna elements in predetermined positions within the vehicle separately from the RF chip.

26. The wireless power transmission to a portable electronic device within a vehicle of claim 21, wherein the pockets of energy are reflected off metal surfaces of the vehicle to the electronic devices in predetermined locations within the vehicle.

* * * * *